(12) United States Patent
Jeremiassen

(10) Patent No.: US 7,805,708 B2
(45) Date of Patent: Sep. 28, 2010

(54) AUTOMATIC TOOL TO ELIMINATE CONFLICT CACHE MISSES

(75) Inventor: Tor E. Jeremiassen, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 922 days.

(21) Appl. No.: 11/382,813

(22) Filed: May 11, 2006

(65) Prior Publication Data

US 2006/0259691 A1 Nov. 16, 2006

Related U.S. Application Data

(60) Provisional application No. 60/680,669, filed on May 13, 2005.

(51) Int. Cl.
G06F 9/44 (2006.01)
G06F 9/445 (2006.01)
(52) U.S. Cl. .................. 717/128; 717/140; 717/148
(58) Field of Classification Search ......... 717/127–136, 717/138–144, 145–148, 156
See application file for complete search history.

(56) References Cited

U.S. PATENT DOCUMENTS

| 5,317,740 | A * | 5/1994 | Sites | 717/129 |
| 5,628,016 | A * | 5/1997 | Kukol | 717/140 |
| 5,689,712 | A * | 11/1997 | Heisch | 717/130 |
| 6,070,009 | A * | 5/2000 | Dean et al. | 717/130 |
| 6,463,582 | B1 * | 10/2002 | Lethin et al. | 717/158 |
| 6,678,883 | B1 * | 1/2004 | Berry et al. | 717/128 |
| 6,681,384 | B1 * | 1/2004 | Bates et al. | 717/129 |
| 7,032,217 | B2 * | 4/2006 | Wu | 717/158 |
| 7,069,544 | B1 * | 6/2006 | Thekkath | 717/128 |
| 7,155,690 | B2 * | 12/2006 | Yamashita et al. | 716/5 |
| 7,168,066 | B1 * | 1/2007 | Thekkath et al. | 717/128 |
| 7,203,933 | B2 * | 4/2007 | Souloglou et al. | 717/146 |
| 7,222,336 | B2 * | 5/2007 | Willis | 717/148 |
| 7,356,805 | B2 * | 4/2008 | Ding et al. | 717/128 |
| 7,448,031 | B2 * | 11/2008 | Wu | 717/161 |
| 7,506,326 | B2 * | 3/2009 | McIntosh | 717/140 |
| 7,516,446 | B2 * | 4/2009 | Choi et al. | 717/128 |
| 7,536,682 | B2 * | 5/2009 | Dankel et al. | 717/139 |
| 7,617,493 | B2 * | 11/2009 | Mitran et al. | 717/148 |
| 7,657,877 | B2 * | 2/2010 | Vorbach et al. | 717/141 |

(Continued)

OTHER PUBLICATIONS

Gopalan et al, "Improving route lookup performance using network processor cache", IEEE, pp. 1-10, 2002.*

(Continued)

Primary Examiner—Anil Khatri
(74) Attorney, Agent, or Firm—Mirna Abyad; Wade J. Brady, III; Frederick J. Telecky, Jr.

(57) ABSTRACT

This invention simulates program to create a conflict graph of the cache accesses. The conflict graph is used to relay out relocatable functions to minimize cache conflict misses where conflicting functions map to the same portion of the cache. The conflict graph includes a vertex for each function and an edge between functions having a weight corresponding to a conflict amount. This conflict graph enables a layout of functions to minimize the number of conflicting items that map to the same location in the cache weighted by the degree of conflict encoded by the edges in the graph.

18 Claims, 4 Drawing Sheets

U.S. PATENT DOCUMENTS 7,661,096 B2 * 2/2010 Meijer et al. ................ 717/140

OTHER PUBLICATIONS

Etsion et al, "L1 cache filtering through random selection of memory references", IEEE, pp. 235-244, 2007.*

Vandierendonck et al, "Application specific reconfigurable XOR indexing to eliminate cache conflict misses", ACM EDAA, pp. 357-362, 2006.*

Collins et al, "Runtime identification of cace conflict misses: The adaptive miss buffer", ACM Trans. on Computer Sys. vol. 19, No. 4, pp. 413-439, 2001.*

* cited by examiner (1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

AUTOMATIC TOOL TO ELIMINATE CONFLICT CACHE MISSES

CLAIM OF PRIORITY

This application claims priority under 35 U.S.C. 119(e)(1) to U.S. Provisional Application No. 60/680,669 filed May 13, 2005.

TECHNICAL FIELD OF THE INVENTION

The technical field of this invention is cache memory and more particularly preventing conflict cache misses.

BACKGROUND OF THE INVENTION

A direct-mapped program or data cache, or a program or data cache with limited associativity can incur extra, unnecessary cache misses. These conflict misses are causes when multiple program or data items frequently accessed map to the same location in the cache. These misses are generally unnecessary because the cache is usually big enough to hold the working set of the program. Such conflict cache misses occur only because of the limitations of the mapping policy in the cache. When multiple items map to the same locations in the cache, normal accesses may cause them to repeatedly evict each other even though the cache is big enough to hold all then items. This behavior is known as thrashing.

While conflict misses seem to be only due to the mapping of items into the same locations in the cache, there is a temporal aspect to this problem. Two items that map to the same location in the cache will only generate conflict misses if accesses to them occur close enough in time so that the misses are only due to mapping and not to the limited size of the cache. The latter case is called a capacity cache miss and is not a conflict miss.

The current trend of data processor and external memory speeds will cause the cache miss penalty to grow. Thus this problem will get significantly worse. Thus there is a need to improve cache behavior.

This problem could be mitigated manually. Such manual solution is difficult because it requires understanding of caches and how they operate, the memory reference pattern and its relation to layout. A system programmer could generate and test possible solutions. However, this process generally seems like fumbling in the dark. The system programmer could use feedback from a simulator or emulator to know where the misses occur and perhaps even when they occur. There are known in the art visual tools to aid this process. The solution to this conflict miss problem is still very difficult even when such a visual tool reveals where, when and which conflicts cause cache misses. Often changing the program layout to solve one conflict creates or worsens another conflict. This problem is like pushing on a balloon. Applications with multiple data sets, such as an MPEG-2 decoder, often create different sets of conflicts. Thus initial efforts at system design provide poor out of the box performance

SUMMARY OF THE INVENTION

This invention runs a target program on a simulator or an emulator and creates a trace of the cache accesses. The invention uses this trace of accesses to model which program or data items inherently conflict in the cache. Two items inherently conflict in the cache if mapping them to the same location in the cache would generate conflict misses during execution of the program. This inherent conflict determination takes into account the temporal aspect of such conflicts.

This invention uses these inherent conflicts to construct an interference graph between the items stored in the cache. For example, the items may be individual functions in the program cache but could also be groups of functions or fractions of functions. Each item would be a vertex in this graph. There would be an edge between vertices A and B if and only if A had an inherent conflict with B or B had an inherent conflict with A. Each edge carries a weight that is a measure of the degree by which the vertices conflict. The weight might be the number of inherent conflicts detected during simulation/execution.

The invention uses this conflict graph to produce a layout of the items to minimize the number of conflicting items that map to the same location in the cache weighted by the degree of conflict encoded by the edges in the graph. This layout is produced using a two-stage process. In the first stage, the graph is partitioned into a k-partite graph, where the total size of the elements in each of the k partitions is no greater than the cache size divided by the cache associativity. In the preferred embodiment the partition algorithm iteratively allocates those vertices that are connected by the highest weight edges to the same partition until that partition is filled up. The partition algorithm continues with the next partition. This first allocation guarantees that no two items that are allocated in the same partition can generate any cache conflict misses.

The second stage considers each of the partitions in order starting with the second partition. The first partition is kept unchanged. Specifically, the items are kept in order of insertion into the partition. The items in each partition are placed in an order that minimizes the number of actual conflicts with functions in previous partitions. Two items in different partitions have an actual conflict measure that is the product of the degree to which they map to the same locations in the cache and the weight of the conflict edge that connects them in the conflict graph. This weight would be zero if there is no such edge.

Following these two stages, there are k partitions of the items either program or data. When each partition is allocated starting on a memory address that is a multiple of the cache size divided by cache associativity, the number of conflict cache misses should be minimized.

This invention could use multiple conflict graphs, each generated from a different run of the same program possibly using different input data. This invention then merges the conflict graphs so as to get better layouts that take into account, either longer running times or bi- or multi-mode behavior of the application. The latter is common in many decoders, in particular video decoders such as MPEG-2 and Windows Media video decoder.

BRIEF DESCRIPTION OF THE DRAWINGS

These and other aspects of this invention are illustrated in the drawings, in which.

DETAILED DESCRIPTION OF PREFERRED EMBODIMENTS

A preferred embodiment of this invention will be described in this section. This invention is not limited to the preferred embodiment. It would be a straight forward task for one skilled in the art to apply the invention to a larger class of data processing architectures that employ statically scheduled execution with predication mechanism. This description corresponds to the Texas Instruments TMS320C6400 digital signal processor.

Figure 1:
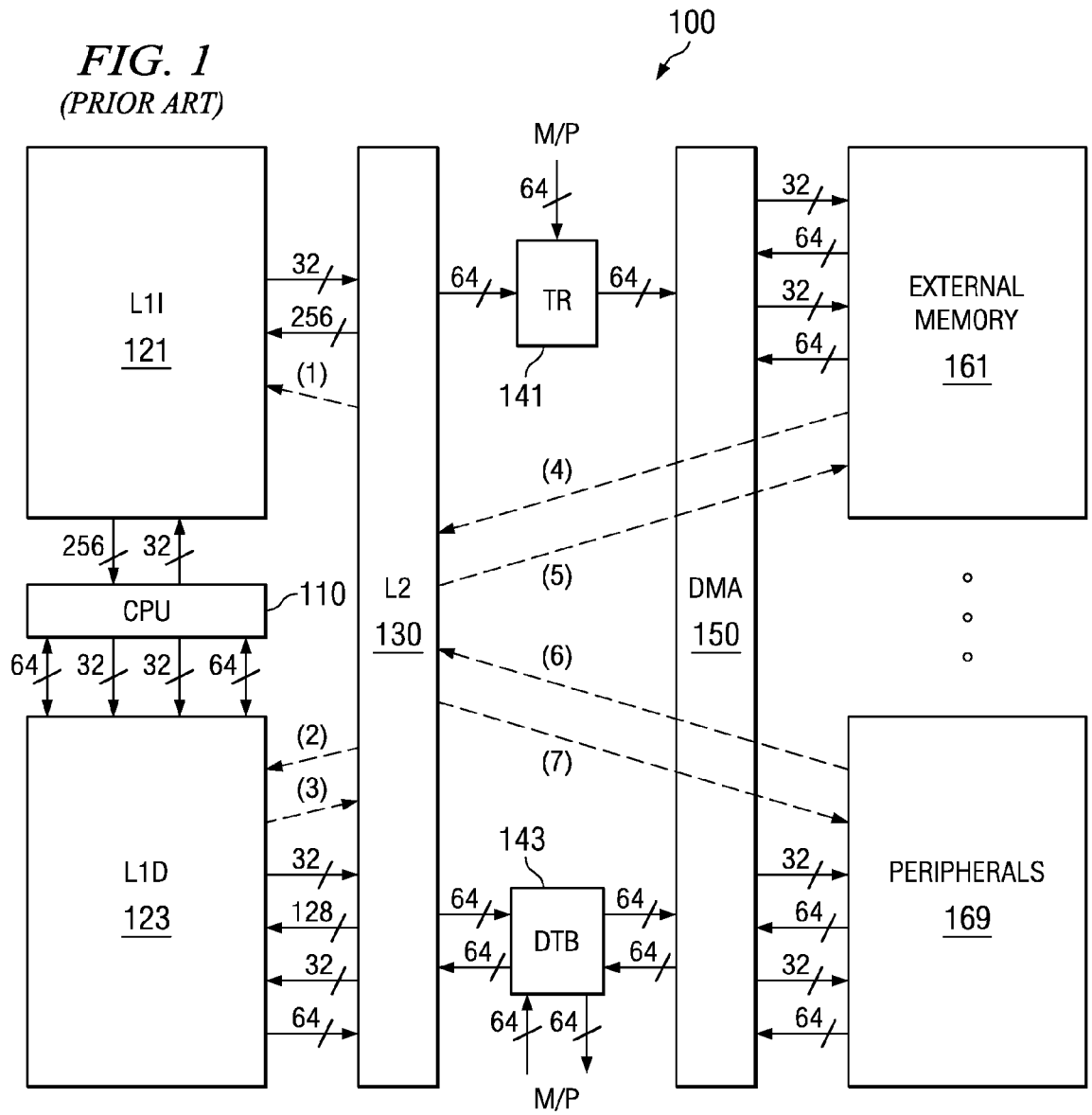
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
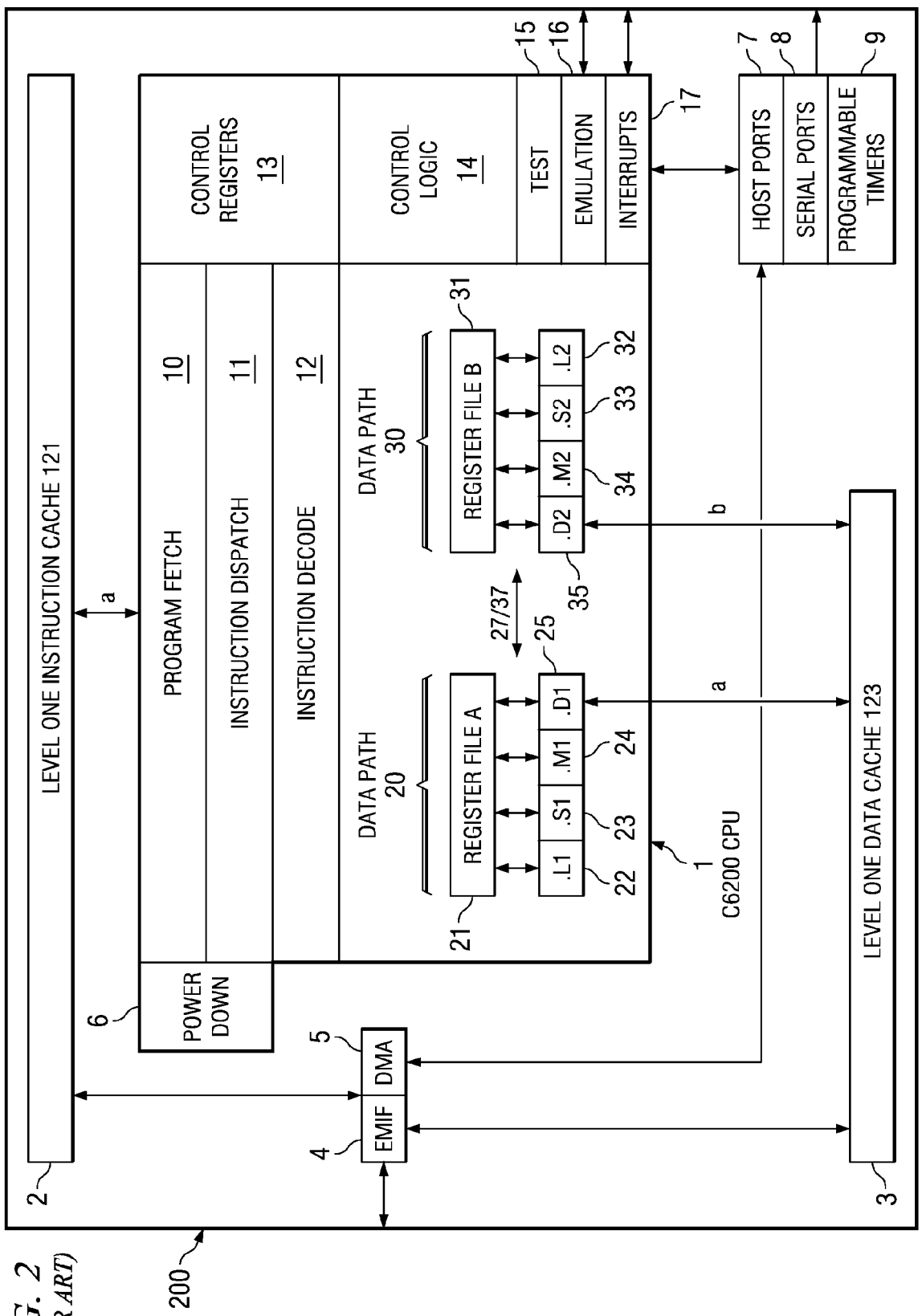
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
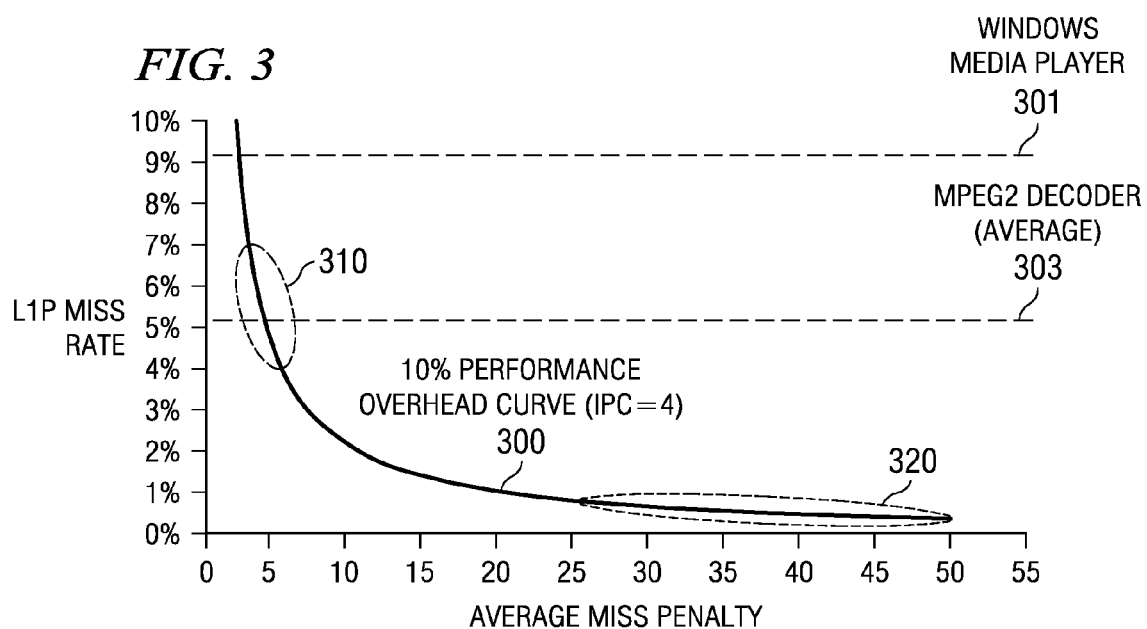
FIG. 3 illustrates a typical cache performance curve for data processors of the class illustrated in FIGS. 1 and 2.

FIG. 3 illustrates cache performance curve 300 for data processors of the class illustrated in FIGS. 1 and 2. Cache performance curve 300 is for a 10% overhead and an average number of instructions per cycle (IPC) of 4. As detailed above data processors of this class have a maximum instructions per cycle of 8. Cache performance curve 300 includes regions 310 and 320. Region 310 outlines the typical cache hit rate and average cache miss penalty for a data processor such as illustrated in FIGS. 1 and 2. Region 320 outlines the typical cache hit rate and average cache miss penalty for a data processor of the same type except omitting level two unified cache (L2) 130. Level one instruction cache 121 and level one data cache 123 are larger for the example data processor of region 320 than the data processor of region 310. Thus region 310 shows a higher cache miss rate due to smaller level two caches than region 320. In addition, region 310 has a smaller cache miss penalty due to the presence of level two unified cache 130 than region 320.

FIG. 3 illustrates the cache miss rate 301 for running a windows media player decoder and cache miss rate 303 for running a MPEG-2 decoder. As shown in FIG. 3, neither region 310 nor 320 can guarantee running the windows media player decoder program in real time. Region 310 is marginal to run the MPEG-2 decoder in real time while region 320 cannot guarantee running in real time.

The root cause of conflict cache conflicts is poor layout of functions. In most data processors the default link order is by size of input section in the program module/file. This invention seeks better layouts based on compiler analysis of applications. This invention is premised on the principle that static compliers cannot determine dynamic behavior and its impact on cache performance. This determination must be deferred until link time.

Figure 4:
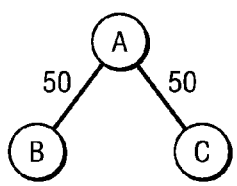
FIG. 4 illustrates an example conflict map linking program modules A, B and C.

FIG. 4 illustrates a linking between program modules A, B and C. These are linked in that module A calls module B 50 times and calls module C 50 times. Assuming these are laid out in memory in a manner that causes conflict cache misses, it is not possible to determine the conflict cache misses statically. The following dynamic examples show this.

EXAMPLE 1

ABBBBBBBB . . . BBCCCCCCCC . . . CC

In example 1, which is module A, 50 calls of module B and 50 calls of module C, there are no conflict cache misses. Module A is flushed once to make room for module B. Module B is flushed once to make room for module C. These are necessary cache misses because the cache is not large enough to hold all three modules.

EXAMPLE 2

ABCBCBCBCBCBCBC . . . BCBC

In example 2, module A is followed by alternating calls of modules B and C. This pattern generates 98 conflict misses because modules B and C map to the same portion of cache. Each swap between these modules generates a conflict cache miss.

EXAMPLE 3

ABBCCBBCCBBCCBBCC . . . BBCC

In example 3, module A is followed by an alternating block of two calls of module B and two calls of module C. This pattern generates 48 conflict cache misses.

EXAMPLE 4

ABBBBBCCCCCBBBBB . . . CCCCC

In example 4, module A is followed by an alternating block of five calls of module B and five calls of module C. This pattern generates 8 conflict cache misses. Thus it can be seen that the same number calls of the same modules can generate differing numbers of conflict cache misses. Which pattern actually occurs might be data dependent, thus static tests cannot solve this problem.

The best solution to detecting and avoiding conflict cache misses is achieved by basing the layout of instructions and data on actual conflicts that occur in the program at run-time. This process requires measurement of function to function conflicts during program execution. The conflict information measured must be independent of a particular layout. This requires determining which functions have inherent conflicts. Lay out functions accordingly requires no iteration. Thus this invention requires a simulation or emulation based platform.

This invention includes an instrumented simulator to track function cache conflicts. This simulator produces a function conflict graph. This invention can produce multiple graphs for the same program using different input data. A layout program analyzes one or more such profiles and produces a function layout that minimizes the conflicts detected by the simulator. This function layout can be used to manually edit a linker command file to force the linker to allocate the functions in the determined order and locations. An alternative embodiment integrates the conflict analysis and layout algorithms in the linker using conflict profile information from the simulator. This minimizes the number of user steps.

This invention works with trace emulation too. Trace functionality generates a sequence of program counter values. The trace emulation tool can use the program counter values and function symbolic information and produce a conflict graph. This alternative merges conflict graphs to compensate for limited duration of traces. This reduces the storage requirement of practicing the invention. There is no need to keep a trace after it has been used to produce a conflict graph.

Figure 5:
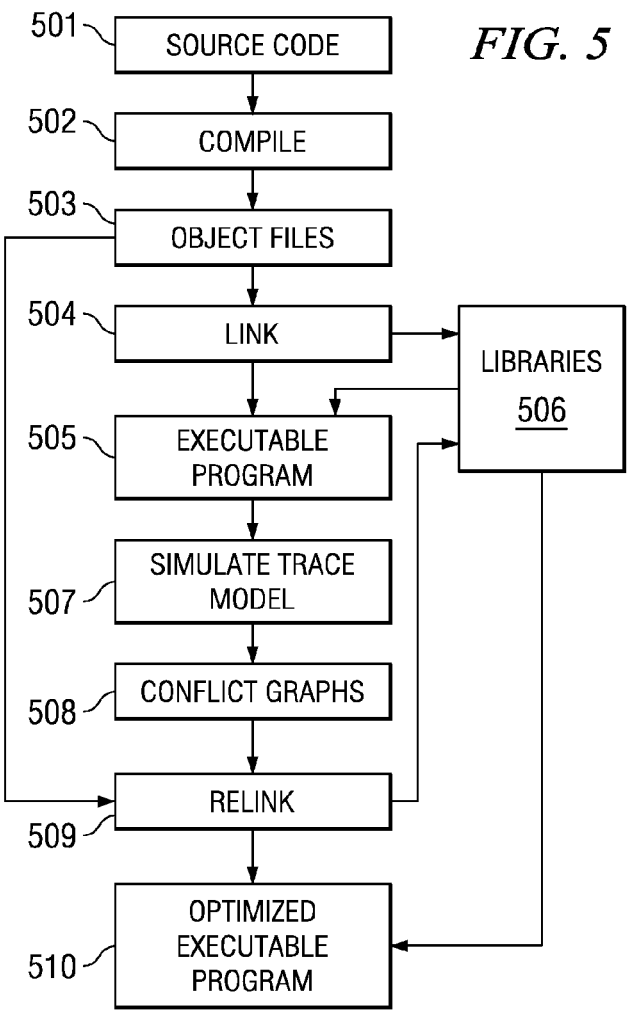
FIG. 5 illustrates the process of this invention.

FIG. 5 illustrates the process of this invention. The process begins with generation of a source code 501 by a programmer. Next compiler 502 generates object files 503. Linker 504 links the object files 503 into executable program 505 optionally using library routines in libraries 506. Simulate, trace, model block 508 generates conflict graphs 507. Based upon the conflict graphs 507 object files 503 are relinked 509 using optional libraries 506. The result is optimized executable program 510.

In the preferred embodiment the compiler 503 generates symbolic information about function size and location to enable collection of conflict information. This symbolic information allows detection of transfer between functions such as a call or return. This feature is not commonly included by default and many libraries lack this information.

In the preferred embodiment these functions must be separately relocatable. This feature is required to enable lay out individual functions to reduce cache conflicts. In the preferred embodiment this relocation is only allowed relocation at module (file) level even for libraries. This separate relocatability of functions costs space but reduces cache overhead significantly. Space overhead is not strictly necessary. Current compilers require functions to be 32-Byte address boundary aligned.

In this invention it would be ideal to compute a layout independent measure of function conflicts. It would generally not be sufficient to use computed conflict cache misses from a simulation. This is because conflict cache misses are layout dependent and change when layout changes. This invention captures and quantifies the fact that any code that executes between repeated executions of a function p could conceivably evict p and cause cache misses. The simulation of this invention must ignore the actual layout and consider only the temporal order of accesses. The magnitude of the conflict corresponds to the number of possible cache misses that p could incur. The goal of this invention is to create a function layout that minimizes conflicting positioning of functions that show a high degree of temporal interference In accordance with this invention two functions p and q conflict if the repeated execution of p is delimited by executions of q. Thus q conflicts with p if q has the opportunity to evict p from the cache between repeat executions of p.

This invention is also concerned about conflicts within a predefined time span. The time span used to measure conflicts within the simulation must reasonably approximate a function's expected lifetime in the cache barring any conflicts. If the simulation selects a time span is too short, it will not count conflicts that will cause cache misses. If the simulation selected a time span is too long, it will count conflicts that will not cause cache misses. The ideal time span is application dependent and may be different for different functions. It depends on the number of different cache blocks referenced and the capacity of the cache. The question to ask for counting a conflict is it reasonable to expect that p should be in the cache when it is re-executed?

This invention must detect and count cache conflicts. In the preferred embodiment this process begins by streaming references to level one instruction cache (L1I) 121 references through a fully set-associative cache. This streaming should simulate a least recently used (LRU) replacement of cache blocks in order of most recently used. If there are no mapping conflicts in then this eliminates conflict misses. The size of the simulation cache should relate to size of the original level one instruction cache (L1I) 121 or smaller down to about one half the size of the level one instruction cache (L1I) 121.

For a given reference a(p) to cache block a in function p that hits in the fully set-associative cache, for each function q (not equal to p) that has one or more cache blocks b(q) that is more recently referenced than the previous reference to a(p), add 1 to the conflicts between p and q. This counts when the cache block b(q) could have evicted a(p) and caused a conflict miss if p and q were allocated in memory so they conflicted in a non fully set-associative cache. Only one miss is induced per function since a(p) could only be evicted once.

The conflict graphs are formed as follows. These are undirected because actual conflicts seen in the cache are symmetric. That is, if p and q map to the same locations in the cache, each conflicts with the other. In the conflict graphs each vertex p is a function. Each edge (p,q) between vertices p and q represent conflicts between functions p and q. Edge has a weight representing the number of times p and q conflict. FIG. 4 above is an example of a conflict graph between functions a, b and c. An actual conflict graph will be more complicated because it will generally include many more callable functions.

It is possible to merge multiple conflict graphs as follows. This invention could capture conflicts in the same program derived from different input data sets. Such different input data sets may cause different functions to execute and generate different sets of conflicts. This invention could capture conflicts in the same program and data set over longer intervals. When merging multiple conflict graphs the vertex set is the same across the graphs. Each different simulation is for the same program with the same set of functions. The edge weights of the different graphs can be combined by adding. It is possible to use scaling factors to compensate for cycle differences in the multiple simulations. Thus a longer simulation which generates more conflicts merely by being longer will not dominate the merged conflict graph. This process may exclude low weight edges from each graph. For example, this invention may only consider edges in the 10th percentile and thus discard low conflict edges.

This invention includes two stages of determination function allocation and function ordering.

Function allocation allocates functions to cache size memory segments. This removes any mapping conflicts among functions allocated to the same segment. The goal of function allocation is to keep the highest weight edges contained within segments. This invention partitions the conflict graph into a k-partite graph assuming k segments with the first segments having the highest weight edges.

Figure 6:
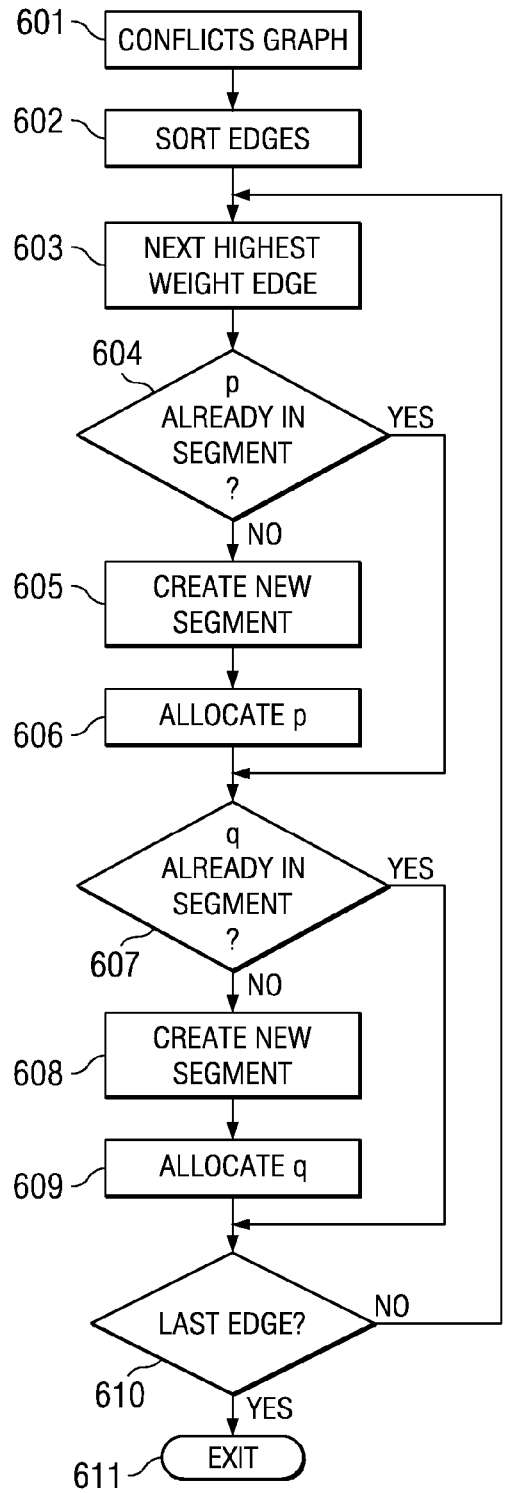
FIG. 6 illustrates a flowchart of the preferred embodiment of function allocation used in this invention.

FIG. 6 illustrates a flowchart of the preferred embodiment of function allocation. This function allocation starts from conflicts graph 601. Function allocation first sorts the edges of the conflict graph by decreasing edge weight in block 602. Function allocation then considers the edge weight list from highest to lowest weight. Function allocation starts from the next highest weight edge at block 603. If this is the first pass through this loop the next highest weight edge is the highest weight edge of the edge sort from block 602. This next highest weight edge has vertexes p and q. Test block 604 determines if function p is already in a segment. If not (No at test block 604), then function allocation creates a new current segment at block 605. Then function allocation places function p in the new segment in block 606. If function p was already in a segment (Yes at text block 604) or following allocation in block 606, test block 607 determines if function q is already in a segment. If not (No at test block 607), then function allocation creates a new current segment at block 608. Then function allocation places function q in the new segment in block 609. If function q was already in a segment (Yes at text block 607) or following allocation in block 609, test block 610 determines if this is the last edge. If this is not the last edge (No in test block 610), the function allocation proceeds to the next highest weight edge at block 602. If this was the last edge (Yes in test block 610), then function allocation is complete at end block 611.

Function ordering orders functions within segments to minimize actual conflicts between segments. This invention uses a greedy algorithm based on weighted conflicts. Function ordering reduces actual conflicts between memory segments. The goal of function ordering is to keep the impact of actual conflicts low.

Figure 7:
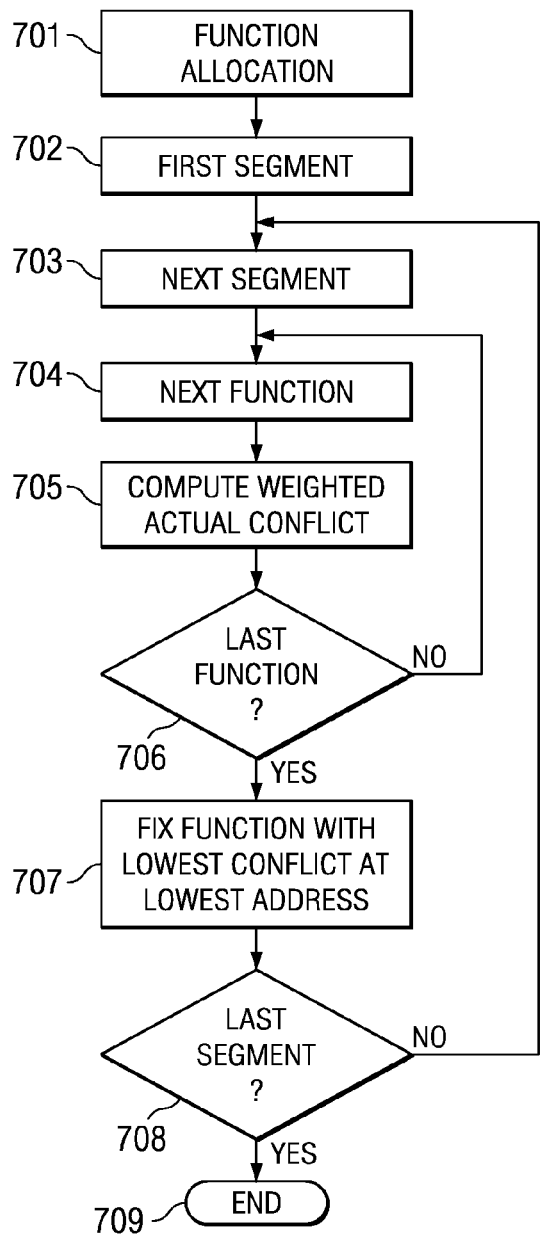
FIG. 7 illustrates a flowchart of the preferred embodiment of function ordering used in this invention.

FIG. 7 illustrates a flowchart of the preferred embodiment of function ordering. Function ordering begins with function allocation 701 as shown in FIG. 6. Block 702 orders functions by decreasing conflict with functions in other segments for the first segment. Block 703 considers the next of the remaining segments in order of creation. Block 704 considers the next unfixed function allocated to the segment in order of allocation. Block 705 computes the total weighted actual conflict between the current function and functions in the previous segment if function f was allocated at the lowest unallocated address in the segment. This total weighted actual conflict is the sum of conflicts between function f and functions it actually conflict with in the previous segment. Each conflict edge is weighted by the degree of overlap relative to max possible.

Consider the following example. Assume function f actually conflicts with functions p and q. Assume the edge weights are <f,p>=100 and <f,q>=200. Assume function f is 128 bytes, function p is 96 bytes and function q is 128 bytes. Lastly, assume function f completely overlaps function p and the rest overlaps function q. The total conflict is the edge weight of <f,p> of 100 scaled by the amount of overlap. This is 96/96 or 1 plus the edge weight <f,q> of 200 weighted by the overlap of 32/128 or ¼. Thus the total conflict value is:

```
100*(96/96)  +200*(32/128)
100          +50
             150
```

Test block 706 tests to determine if this is the last function in the current segment. If not (No at test block 706), then flow returns to block 704 to consider the next function. If this is the last function in the current segment (Yes at test block 706), then block 707 fixes the function f that had the smallest total weighted actual conflict at the lowest available address in the segment.

Test block 708 tests to determine if the current segment is the last segment. If the current segment is not the last segment (No at test block 708), then function ordering returns to block 703 to consider the next segment in order of creation. If the current segment is the last segment (Yes at test block 708), the function ordering is complete and ends at end block 709.

The primary difference of this invention lies in the layout algorithm. This invention results a more accurate layout algorithm that produces better results and is more flexible in the presence of potentially conflicting items that cannot be moved in memory. This invention is also to a good way of handling multi-modal application behavior.

What is claimed is:

1. A method of a signal processor for improving conflict miss cache performance in a data processing program having plural relocatable functions comprising the steps of:
   simulating, at the signal processor, operation of the data processing program to determine cache conflicts where portions of functions map to a same cache entry;
   forming conflict graphs corresponding to said determined cache conflicts;
   relinking the data processing program with at least one relocatable function relocated based upon said conflict graphs and, accordingly, improving said conflict miss cache performance; compiling the data processing program including generating symbolic information about function size and location; and
   wherein said step of simulating operation of the data processing program employees said symbolic information about function size and location.

2. The method of claim 1, wherein:
   said step of forming conflict graphs includes generating a vertex for each relocatable function and an edge between each pair of conflicting functions having an edge weight corresponding to a degree by which the corresponding functions conflict.

3. The method of claim 2, wherein:
   said step of relinking the data processing program includes
   allocating relocatable functions within cache size memory segments, and
   ordering relocatable functions within memory segments to minimize conflict between memory segments.

4. The method of claim 3, wherein:
   said step of allocating relocatable functions includes
   sorting conflict graph edges in order of edge weight from highest to lowest,
   for each conflict graph edge from the highest edge weight to the lowest edge weight
   determining if a first vertex corresponding to a current conflict graph edge is allocated,
   if the first vertex is not allocated, creating a new memory segment and allocating the first vertex to the new memory segment,
   determining if a second vertex corresponding to a current conflict graph edge is allocated, and
   if the second vertex is not allocated, creating a new memory segment and allocating the second vertex to the new memory segment.

5. The method of claim 3, wherein:
   said step of ordering relocatable functions includes
   ordering relocatable functions in a first memory segment by order of decreasing conflict with relocatable functions in other memory segments,
   for each other memory segment in order of creation and for each relocatable function;
   for each non-fixed relocatable function calculating a conflict measure between the relocatable function if located in a lowest available memory in the memory segment and relocatable functions in previously segments; and
   fixing the relocatable function having the lowest calculated conflict measure to the lowest available address in the memory segment.

6. The method of claim 5, wherein:
   said step of calculating a conflict measure includes weighting each edge weight between the relocatable function and other relocatable functions by a degree of overlap relative to a maximum overlap.

7. The method of claim 2, wherein:
   said step of simulating operation of the data processing program includes plural simulations having differing data sets;
   said step of forming conflict graphs includes
   generating a set of vertexes and edges for each simulation, and
   combining corresponding edge weights by adding.

8. The method of claim 2, wherein:
   said step of simulating operation of the data processing program includes plural simulations having differing data sets;
   said step of forming conflict graphs includes
   generating a set of vertexes and edges for each simulation, and
   combining corresponding edge weights by adding as weighted by a time of operation of a corresponding simulation.

9. The method of claim 2, wherein:
   said step of forming conflict graphs includes omitting edge weights of a predetermined proportion of lowest edge weights.

10. An apparatus for improving conflict miss cache performance in a data processing program having plural relocatable functions comprising the steps of:
    means for simulating, at the digital signal processor, operation of the data processing program to determine cache conflicts where portions of functions map to a same cache entry;
    means for forming conflict graphs corresponding to said determined cache conflicts;
    means for relinking the data processing program with at least one relocatable function relocated based upon said conflict graphs; means for compiling the data processing program including generating symbolic information about function size and location; and
    wherein said means for simulating operation of the data processing program employees said symbolic information about function size and location.

11. The apparatus of claim 10, wherein said means for forming conflict graphs includes generating a vertex for each relocatable function and an edge between each pair of conflicting functions having an edge weight corresponding to a degree by which the corresponding functions conflict.

12. The apparatus of claim 11, wherein:
said means for relinking the data processing program includes means for allocating relocatable functions within cache size memory segments, and
means for ordering relocatable functions within memory segments to minimize conflict between memory segments.

13. The apparatus of claim 12, wherein:
said means for allocating relocatable functions includes sorting conflict graph edges in order of edge weight from highest to lowest, for each conflict graph edge from the highest edge weight to the lowest edge weight
means for determining if a first vertex corresponding to a current conflict graph edge is allocated,
means for creating a new memory segment and allocating the first vertex to the new memory segment utilized if the first vertex is not allocated,
means for determining if a second vertex corresponding to a current conflict graph edge is allocated, and
means for creating a new memory segment and allocating the second vertex to the new memory segment utilized if the second vertex is not allocated.

14. The apparatus of claim 12, wherein:
said means for ordering relocatable functions includes
means for ordering relocatable functions in a first memory segment by order of decreasing conflict with relocatable functions in other memory segments, for each other memory segment in order of creation and for each relocatable function, for each non-fixed relocatable function calculating a conflict measure between the relocatable function if located in a lowest available memory in the memory segment and relocatable functions in previously segments, and
means for fixing the relocatable function having the lowest calculated conflict measure to the lowest available address in the memory segment.

15. The apparatus of claim 14, wherein:
said means for calculating a conflict measure includes weighting each edge weight between the relocatable function and other relocatable functions by a degree of overlap relative to a maximum overlap.

16. The apparatus of claim 11, wherein:
said means for simulating operation of the data processing program includes plural simulations having differing data sets;
said means for forming conflict graphs includes
means for generating a set of vertexes and edges for each simulation, and
means for combining corresponding edge weights by adding.

17. The apparatus of claim 11, wherein:
said means for simulating operation of the data processing program includes plural simulations having differing data sets;
said means for forming conflict graphs includes
means for generating a set of vertexes and edges for each simulation, and
means for combining corresponding edge weights by adding as weighted by a time of operation of a corresponding simulation.

18. The apparatus of claim 11, wherein:
said means for forming conflict graphs includes omitting edge weights of a predetermined proportion of lowest edge weights.

* * * * *